No. 727,791. PATENTED MAY 12, 1903.
J. A. HERRICK.
REVERSING VALVE FOR REGENERATIVE FURNACES.
APPLICATION FILED MAY 17, 1902.
NO MODEL. 3 SHEETS—SHEET 1.

Witnesses:
D. S. Williams
Utley Crane

Inventor:
James A. Herrick,
By Charles N. Butler,
Atty.

THE NORRIS PETERS CO., PHOTO-LITHO., WASHINGTON, D. C.

No. 727,791. PATENTED MAY 12, 1903.
J. A. HERRICK.
REVERSING VALVE FOR REGENERATIVE FURNACES.
APPLICATION FILED MAY 17, 1902.
NO MODEL. 3 SHEETS—SHEET 2.
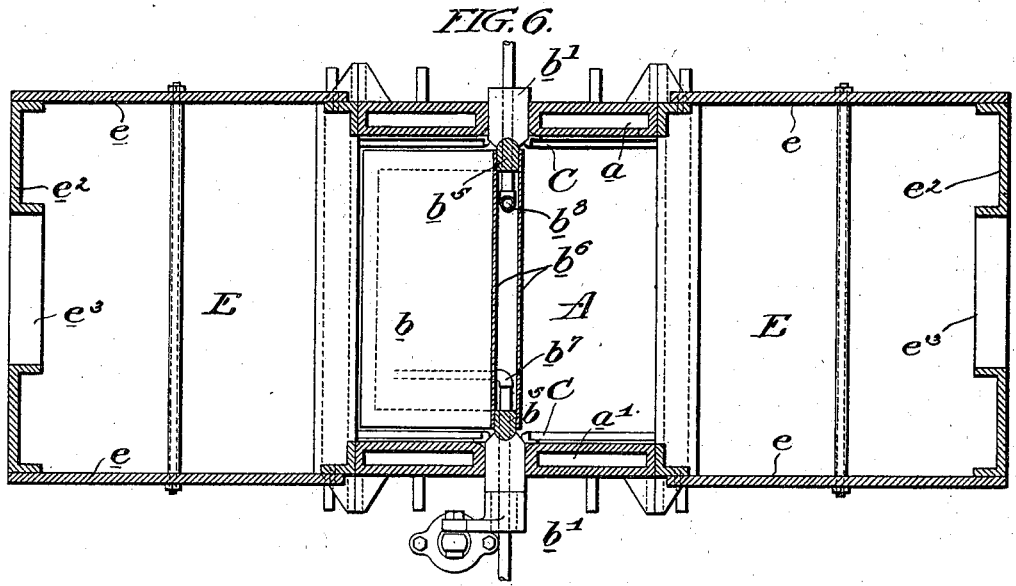
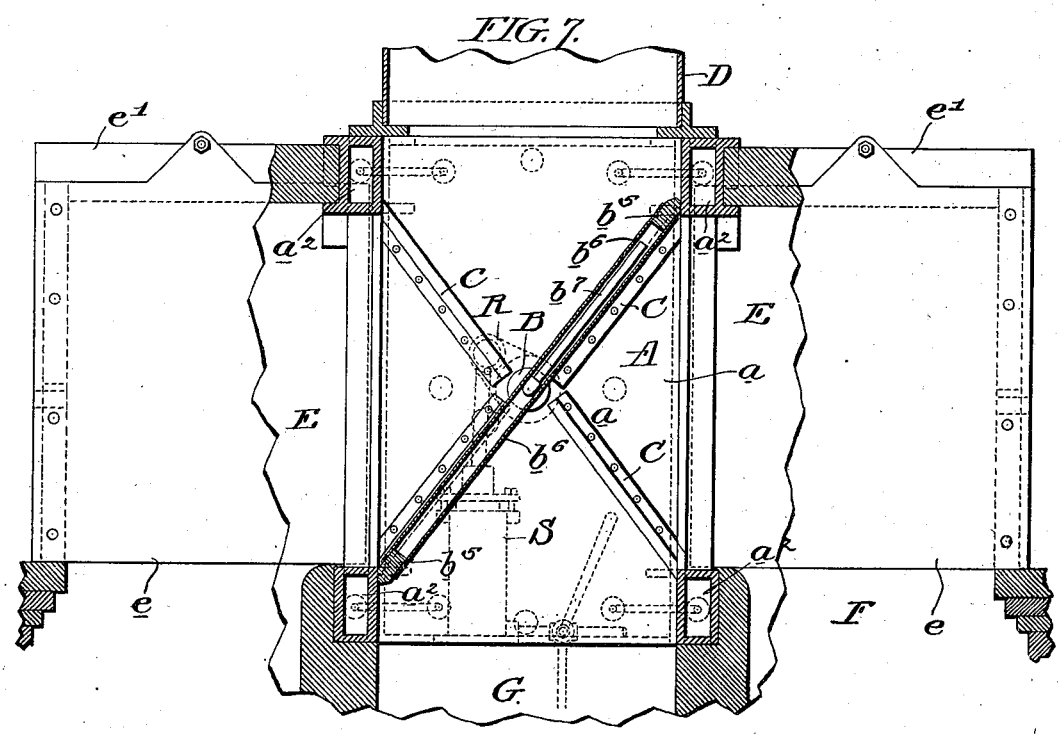
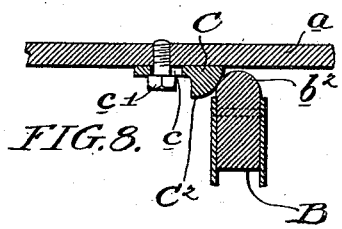

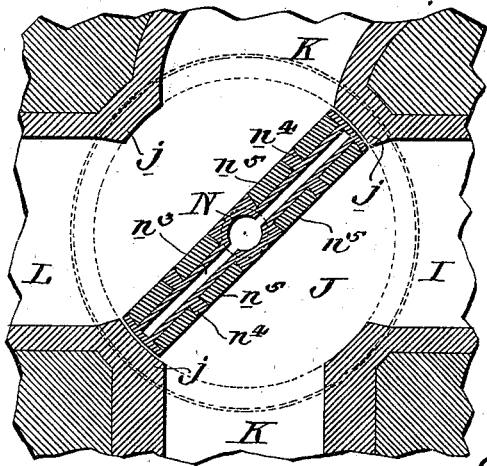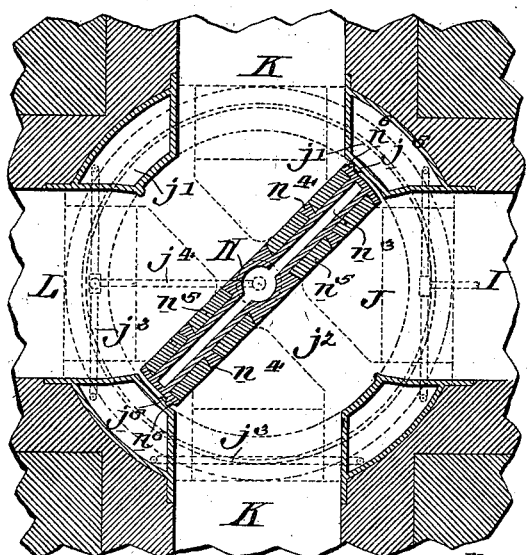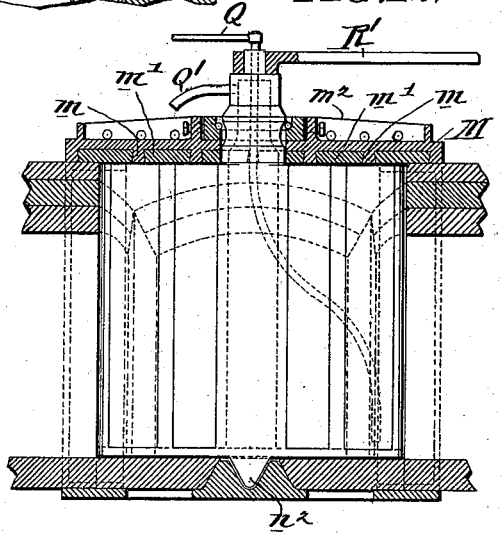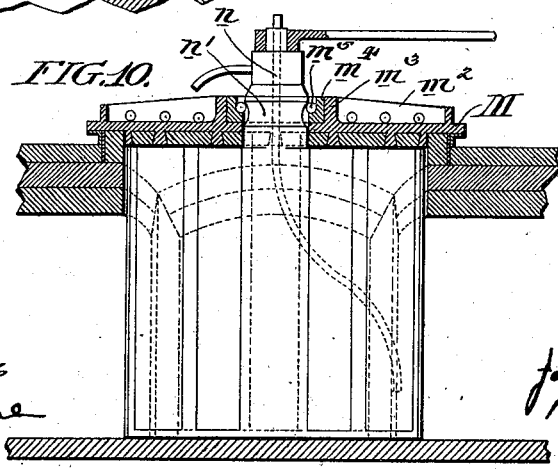

No. 727,791. Patented May 12, 1903.

UNITED STATES PATENT OFFICE.

JAMES A. HERRICK, OF JENKINTOWN, PENNSYLVANIA.

REVERSING-VALVE FOR REGENERATIVE FURNACES.

SPECIFICATION forming part of Letters Patent No. 727,791, dated May 12, 1903.

Application filed May 17, 1902. Serial No. 107,714. (No model.)

*To all whom it may concern:*

Be it known that I, JAMES A. HERRICK, a resident of Jenkintown, in the county of Montgomery and State of Pennsylvania, have invented certain new and useful Improvements in Reversing-Valves for Regenerative Furnaces, of which the following is a specification.

In regenerative furnaces the valves used for reversing the currents of air and gas are subjected to high temperatures which, particularly in large furnaces of high power, cause them to fail. The constructions that have been adopted with a view to meeting such defects have rendered the valves complicated, inaccessible, and expensive without obtaining satisfactory efficiency.

It is the object of the present invention to produce a simple construction having all the exposed parts protected against the cutting action of the flame and readily accessible for examination, adjustment, and repairs.

The nature and characteristic features of the improvements will more fully appear from the following description, taken in connection with the accompanying drawings, in illustration thereof, of which—

Figure 1:
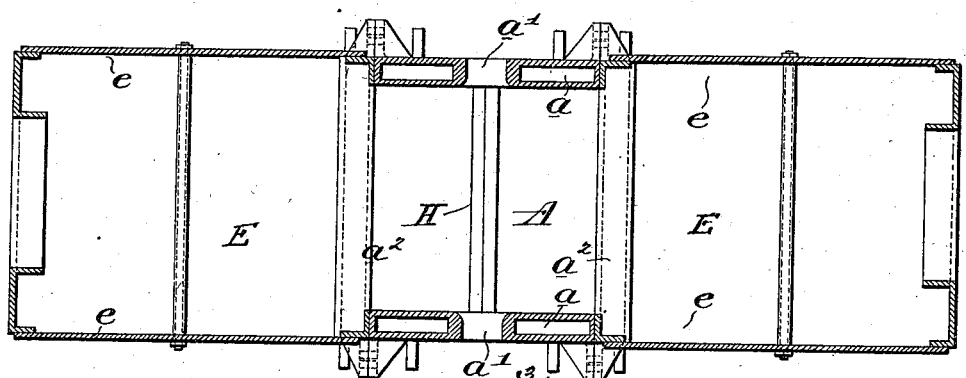
Figures 2, 3:
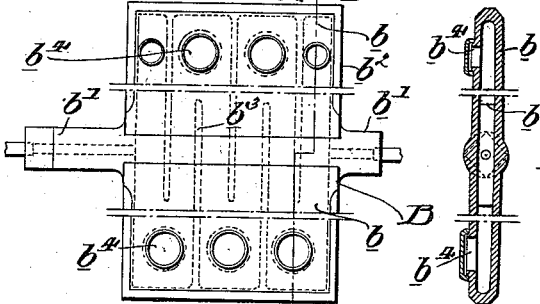
Figure 4:
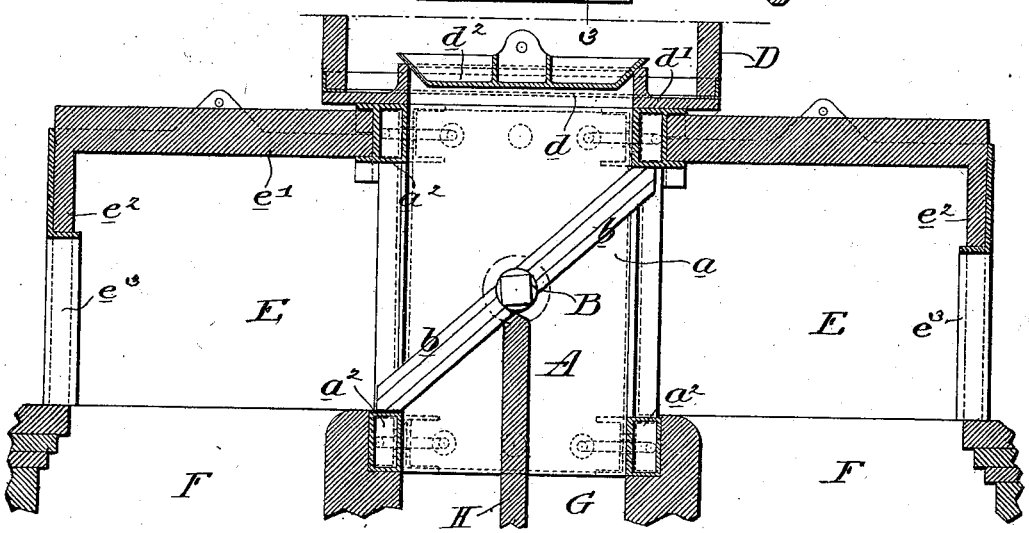
Figure 5:
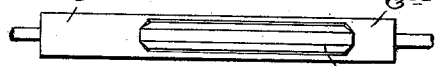

Figure 1 is a sectional plan view of a valve-chamber and connections made in accordance with my invention. Fig. 2 is an elevation of a valve-butterfly adapted for use in the valve-chamber shown in Fig. 1. Fig. 3 is a sectional view taken on the line 3 3 of Fig. 2. Fig. 4 is a vertical sectional view in further illustration of the mechanism shown in Fig. 1 and Fig. 2. Fig. 5 is a top plan view of the valve-butterfly. Fig. 6 is a sectional plan view in illustration of a modified construction. Fig. 7 is an elevation, partially in section, in further illustration of the construction shown in Fig. 6. Fig. 8 is a sectional view in illustration of details of the construction shown in Fig. 7. Fig. 9 is a sectional plan view of a further modification of the invention. Fig. 10 is a vertical sectional view of the construction illustrated in Fig. 9. Fig. 11 is a sectional plan view in illustration of a modification of the structure shown in Figs. 9 and 10, and Fig. 12 is a vertical sectional view of the construction illustrated in Fig. 11.

As shown in Figs. 1 to 8 of the drawings, the valve-body or chamber A comprises the hollow water-cooled cheeks $a$, having the water-cooled bearings $a'$ and the connecting water-cooled boxes $a^2$, which act as bearings for the valve-butterfly. The butterfly B has the hollow water-cooled wings $b$, which normally rest on the bearings $a^2$, and the hollow water-cooled journals $b'$, which are mounted on the bearings $a'$. The cheeks $a$ have the bearing-ribs C secured thereto by means of the transverse slots $c$ therein, through which bolts $c'$ are passed into the cheeks, the curved bearings $c^2$ thereof being thus made adjustable to form a gas-tight joint with the curved edges $b^2$ of the butterfly B, which lie sufficiently within the cheeks to compensate for the usual deposits in the valve and distortions due to high temperatures, which interfere with the proper working of gas-tight joints in the usual valve operation.

The butterfly B may be cast so that its wings $b$ form a hollow box having the interior strengthening-ribs $b^3$, connecting the walls thereof and terminating so as to form communicating channels, effecting an active circulation of water therethrough, the water being admitted and withdrawn through the hollow journals $b'$, which are cooled thereby. Capped openings $b^4$ are provided in the butterfly for obtaining access to the interior thereof and cleaning out deposits of sediment, which prevent the water from properly cooling the metal and result in the burning of the latter. The butterfly may also be constructed from a steel frame $b^5$ and the boiler-plates $b^6$ secured thereto in any suitable manner for the production of a water-tight box, to which water is delivered by the pipe $b^7$ and removed by the pipe $b^8$.

The valve-chamber A is connected with the gas-supply pipe D by the port $d$, formed in the seat $d'$, which supports the mushroom-valve $d^2$ and the supply-pipe D.

The bonnets or outside chambers E communicate with the valve-chamber A and the regenerator-passes F and are formed of the refractory lined sides $e$, the refractory top $e'$, and the refractory lined ends $e^2$, having the normally closed manholes $e^3$, giving ready access for inspection and repairs.

The passage G carries to the stack the waste gases which flow from the regenerators by way of the passages F, E, and A. A wall H, placed centrally in the chamber A and passage G, diverts the gases escaping from the furnace and prevents them from striking and cutting out the butterfly-wings and the bearings therefor.

In Figs. 9 to 12 are shown modified constructions adapted for very high temperatures, as when the flame is carried by the passage I directly through the valve-chamber J to the regenerator-passes K and the hot air is carried from the regenerator-passes K through the valve-chamber J to the hot-air pass L. In these constructions the valve-chamber J is made circular, having the brick walls $j$ or the water-cooled boxes $j'$ supported upon a common frame $j^2$ and connected by pipes $j^3$, which are connected by the pipe $j^4$ with the interior of the valve N. The top of the valve-chamber is covered by a cast-iron cap M, having the angular projections $m$ for holding the fire-brick facings $m'$ and the perforated rim $m^2$ for circulating water poured upon the cap for cooling it. The cap is provided with a seat $m^3$, adapted for holding a bearing-ring $m^4$ and balls $m^5$.

The butterfly N has the hub $n$ with the concave ring or groove $n'$, engaged by the balls $m^5$, by which the butterfly is supported and rotated. The butterfly-wings comprise the hollow casting $n^3$, having the angular projections $n^4$ for holding the fire-brick facings $n^5$. The butterfly is preferably made of smaller diameter than the chamber in which it operates and provided with the ribs $n^6$, adapted to engage with the ribs $j^5$ of the chamber, forming a tight joint and free play for the butterfly. Water is passed into the butterfly by the pipe Q and emptied by the pipe Q' upon the cap M.

The valves may be operated in any suitable manner, as by a crank R and hydraulic ram S or by a hand-lever R'. This mechanism provides a substantially tight valve that will not stick, but makes close joints while working freely under changes that ordinarily put a valve out of operation. It provides means for preventing the parts subject to the cutting action of the highly-heated gases from being destroyed by cooling such parts in an advantageous manner. It is readily accessible and of cheap construction.

It will be understood that modifications may be made in the details of construction without departing from the spirit of my invention.

Having described my invention, I claim—

1. In a reversing-valve, a hollow butterfly having one or more open journals providing means for circulating water therethrough and through said butterfly, in combination with a chamber having cheeks between which and the edges of said butterfly there are free spaces to compensate for distortions and deposits, ribs secured to said cheeks and adjustable to the edges of said butterfly, and a water-cooled bearing or bearings for said butterfly, substantially as specified.

2. In a reversing-valve, a hollow butterfly having one or more open journals providing means for circulating water therethrough and through said butterfly, ribs dividing the interior of said butterfly into water-circulating channels communicating with said open journal or journals, and capped openings permitting access to said channels, substantially as specified.

3. In a reversing-valve, a hollow butterfly having one or more open journals providing means for circulating water therethrough and through said butterfly, ribs dividing the interior of said butterfly into water-circulating channels communicating with said open journal or journals, and capped openings permitting access to said channels, in combination with water-cooled bearings for the wings of said butterfly, substantially as specified.

4. In a reversing-valve, a hollow butterfly having one or more open journals providing means for circulating water therethrough and through said butterfly, ribs dividing the interior of said butterfly into water-circulating channels communicating with said journal or journals, and capped openings permitting access to said channels, in combination with a valve-chamber having water-cooled cheeks connected by water-cooled boxes providing bearings for said butterfly, substantially as specified.

5. In a reversing-valve, a hollow butterfly having fire-brick facings and one or more open journals providing means for circulating water therethrough and through said butterfly, substantially as specified.

6. In a reversing-valve, a butterfly comprising an iron core having projections thereon, fire-brick facings engaged by said projections, a journal having a bearing-ring, in combination with a bearing, and supporting-balls adapted to engage said ring, substantially as specified.

7. In a reversing-valve, a valve-chamber, a butterfly therein, passes communicating with said valve-chamber and controlled by said butterfly, and a wall or partition partially dividing said valve-chamber and one of said passes, substantially as specified.

8. In a reversing-valve, a valve-chamber having adjustable bearing-ribs, a hollow butterfly having edges which coact with said bearing-ribs one or more open journals providing means for circulating water therethrough and through said butterfly, and one or more openings in said butterfly for cleaning out deposits of sediment therein, substantially as specified.

9. In a reversing-valve, a valve-chamber, a butterfly whose wings act clear of the cheeks of said chamber, and adjustable ribs on said chamber providing bearings for the wings of said butterfly, said bearings and wings forming a close joint while permitting the butterfly free play, substantially as specified.

In testimony whereof I have hereunto set my hand, this 16th day of May, A. D. 1902, in the presence of the subscribing witnesses.

JAMES A. HERRICK.

Witnesses:
UTLEY CRANE,
FRANCIS S. GINTHER.